(12) United States Patent
Cheng

(10) Patent No.: US 11,187,634 B2
(45) Date of Patent: Nov. 30, 2021

(54) BENDING TEST DEVICE AND BENDING MECHANISM THEREOF

(71) Applicant: TRIPLE WIN TECHNOLOGY(SHENZHEN) CO. LTD., Shenzhen (CN)

(72) Inventor: Shu-Yu Cheng, Shenzhen (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 312 days.

(21) Appl. No.: 16/542,545

(22) Filed: Aug. 16, 2019

(65) Prior Publication Data

US 2020/0393348 A1 Dec. 17, 2020

(30) Foreign Application Priority Data

Jun. 12, 2019 (CN) .......................... 201910507599.0

(51) Int. Cl.
*G01N 3/20* (2006.01)
*G01N 3/02* (2006.01)
*G01N 3/04* (2006.01)

(52) U.S. Cl.
CPC ................ *G01N 3/20* (2013.01); *G01N 3/02* (2013.01); *G01N 3/04* (2013.01); *G01N 2203/0003* (2013.01); *G01N 2203/0023* (2013.01); *G01N 2203/0037* (2013.01); *G01N 2203/0248* (2013.01)

(58) Field of Classification Search
CPC .. G01N 3/20; G01N 3/02; G01N 3/04; G01N 2203/0023; G01N 2203/0248; G01N 2203/0037; G01N 2203/0003
See application file for complete search history.

(56) References Cited

FOREIGN PATENT DOCUMENTS

| CN | 109490117 A | * | 3/2019 | |
| CN | 110296814 A | * | 10/2019 | ............... G01N 3/02 |
| TW | 201738863 A | | 11/2017 | |
| WO | WO-2018120135 A1 | * | 7/2018 | ............... G01N 3/20 |

* cited by examiner

*Primary Examiner* — Jonathan M Dunlap
(74) *Attorney, Agent, or Firm* — ScienBiziP, P.C.

(57) ABSTRACT

A bending test device to bend a product as a test includes a base, a driving mechanism, and a bending mechanism. The driving mechanism and the bending mechanism are set on the base. The bending mechanism includes a supporting member, a rotating plate, a first holding part, and a second holding part. The supporting member is set on the base. The rotating plate is rotatably set on the supporting member. The rotating plate connects to the driving mechanism. The first holding part and the second holding part are set on the rotating plate. The first holding part clamps a first part of a workpiece, the second holding part clamps a second part of the workpiece. The driving mechanism rotates the rotating plate and thus drives the second holding part to rotate and bend the workpiece.

19 Claims, 4 Drawing Sheets

BENDING TEST DEVICE AND BENDING MECHANISM THEREOF

FIELD

The subject matter herein generally relates automated testing during manufacture.

BACKGROUND

Flexible printed circuit boards need to be bent to test performance and endurance. The existing method is to place the workpiece into a fixture and then bend the board manually. Such a method is expensive, inefficient, and human factors may influence the result.

Therefore, there is room for improvement within the art.

BRIEF DESCRIPTION OF THE DRAWINGS

Implementations of the present technology will now be described, by way of embodiments, with reference to the attached figures.

DETAILED DESCRIPTION

Figure 1:
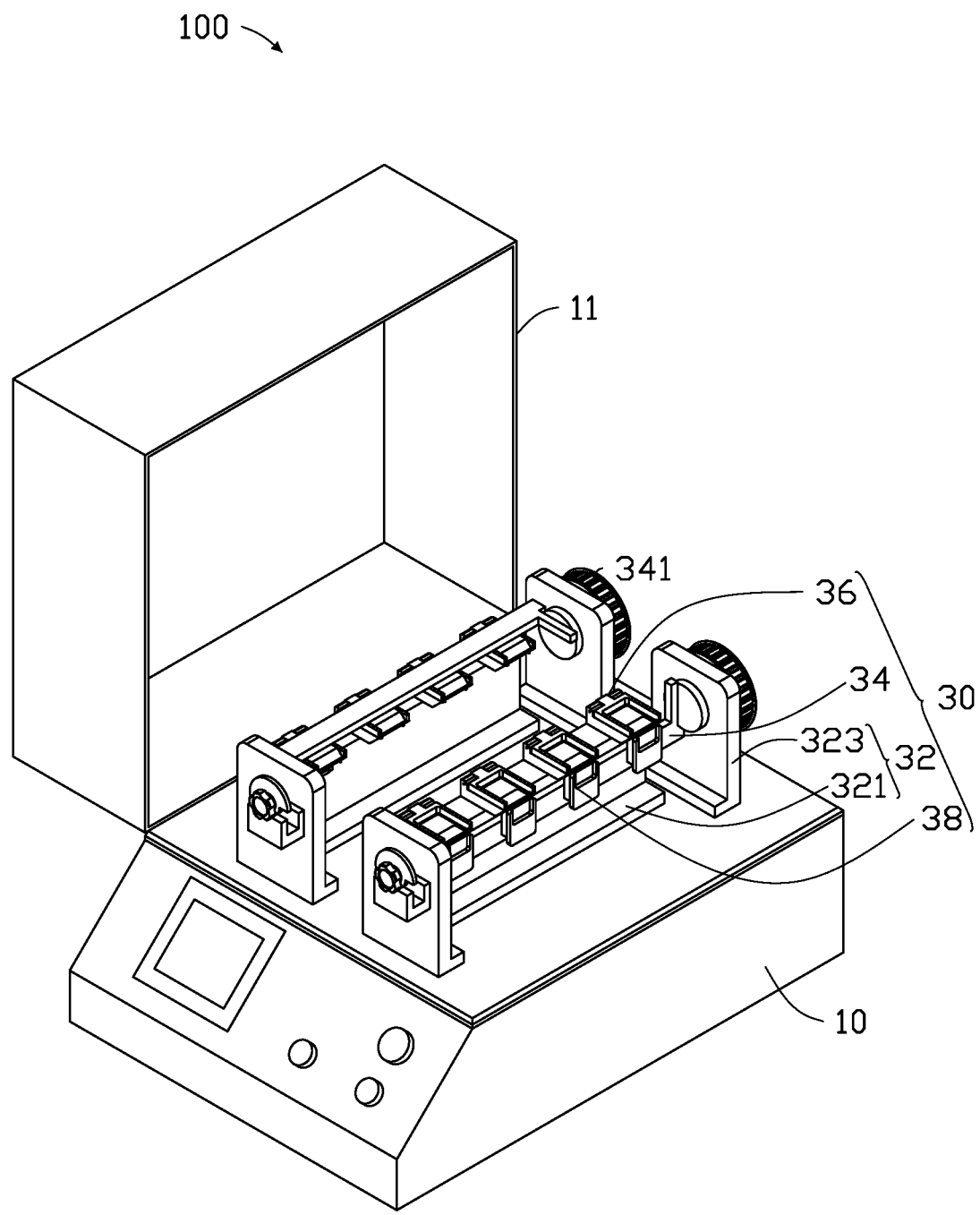
FIG. 1 is a perspective view illustrating the structure of a bending test device in an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Referring to FIG. 1, a bending test device 100 in an embodiment includes a base 10, a bending mechanism 30, and a driving mechanism (not shown in Figs). The bending mechanism 30 is set on the base 10, and is used for bending workpieces. The driving mechanism is set in the base 10 and connected to the bending mechanism 30 to drive it to rotate.

In the embodiment, the number of the bending mechanisms 30 is two. The two bending mechanisms 30 bend workpiece to different angles.

In the embodiment, the base 10 includes a shield 11 enclosing the bending mechanisms 30. In another embodiment, the shield 11 can be omitted.

The bending mechanism 30 includes a supporting member 32, a rotating plate 34, first holding parts 36, and second holding parts 38. The supporting member 32 is set on the base 10. The rotating plate 34 is rotatably installed on the supporting member 32. The first holding parts 36 are set on the supporting member 32. The second holding parts 38 are set on the rotating plate 34 and correspond to the first holding parts 36. One first holding part 36 is used for clamping a first part of a workpiece and one second holding part 36 is used for clamping a second part of the workpiece. The rotating plate 34 drives the second holding part 38 to rotate to bend the workpiece.

The supporting member 32 includes a fixing plate 321 and two side plates 323 which are set on opposite ends of the fixing plate 321. Two ends of the rotating plate 34 are rotatable through the two side plates.

The first holding parts 36 are set on one side of the fixing plate 321 which is away from the base 10. In the embodiment, the number of the first holding parts 36 is four. In another embodiment, depending on the testing, the number of the holding parts 36 can be one or more than one.

Figure 2:
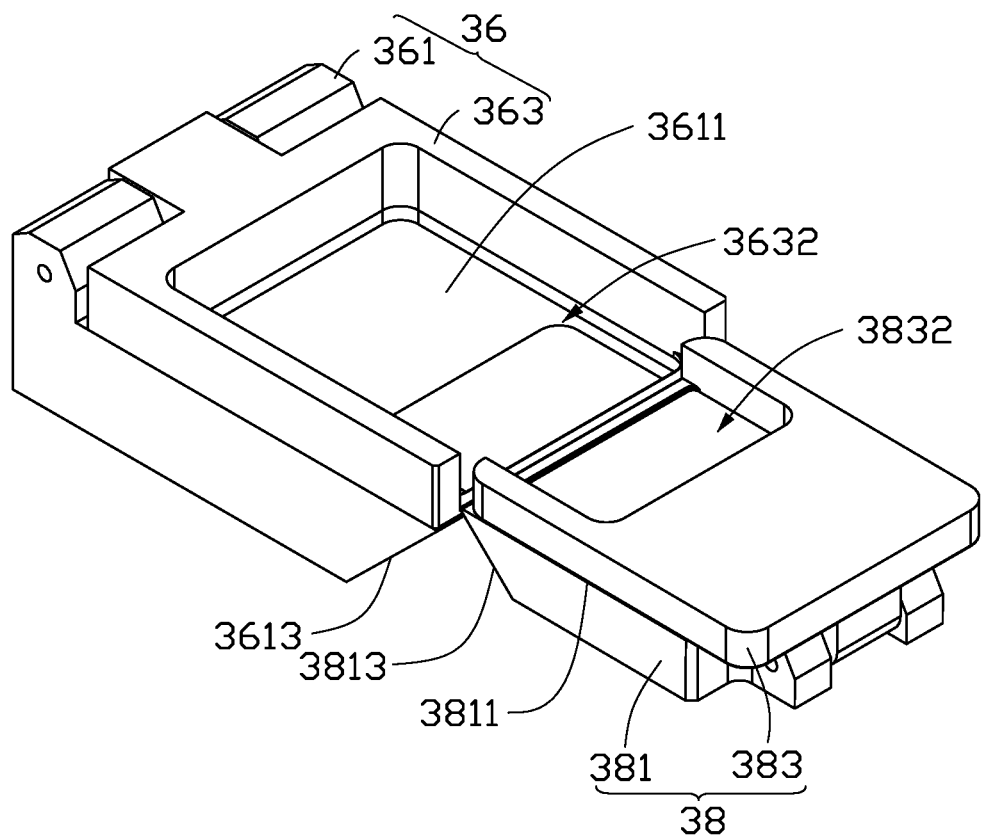
FIG. 2 is a perspective view illustrating the structure of a first holding part and a second holding part of the bending test device of FIG. 1 in one state.
Figure 3:
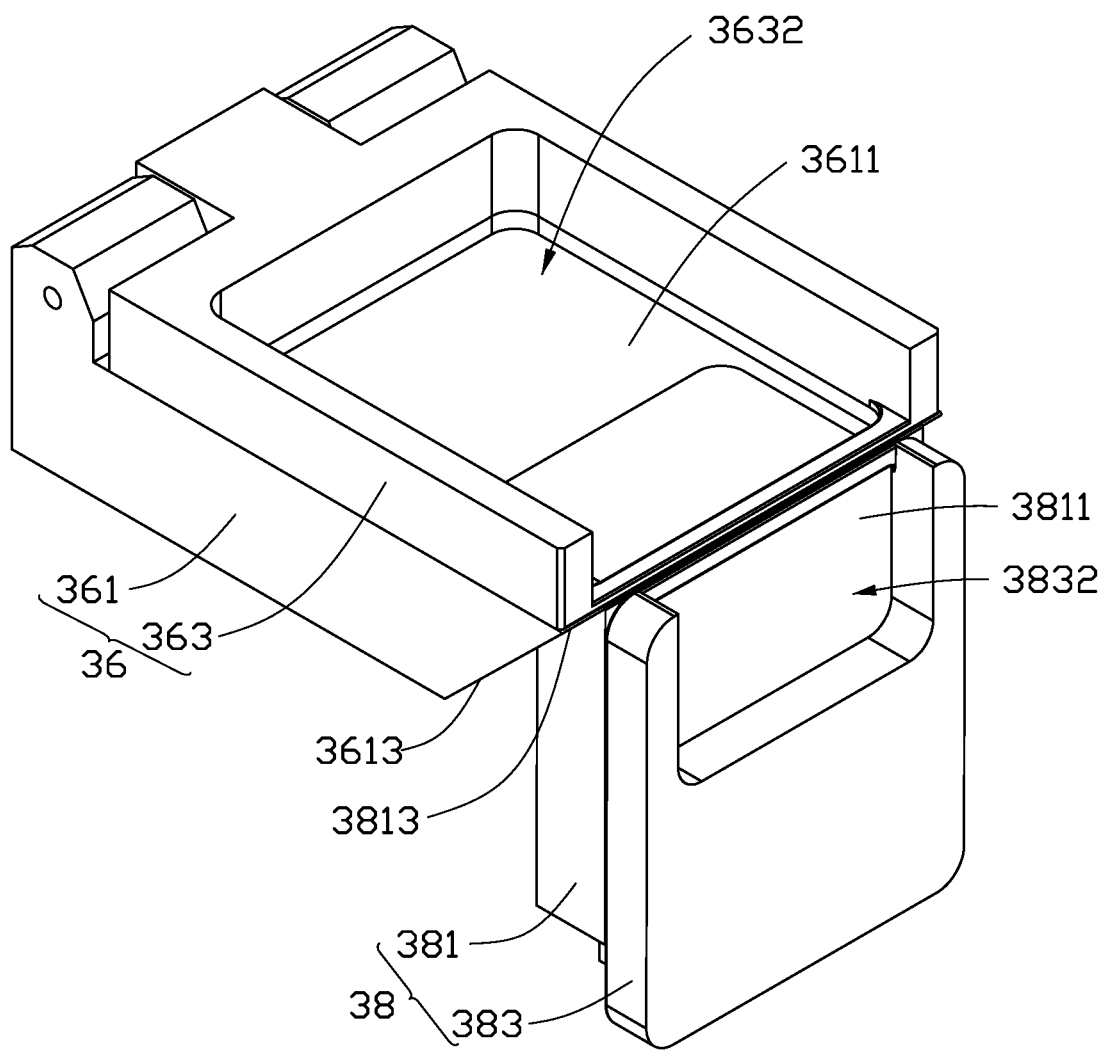
FIG. 3 is a perspective view illustrating the structure of the first holding part and the second holding part of FIG. 1 in another state.
Figure 4:
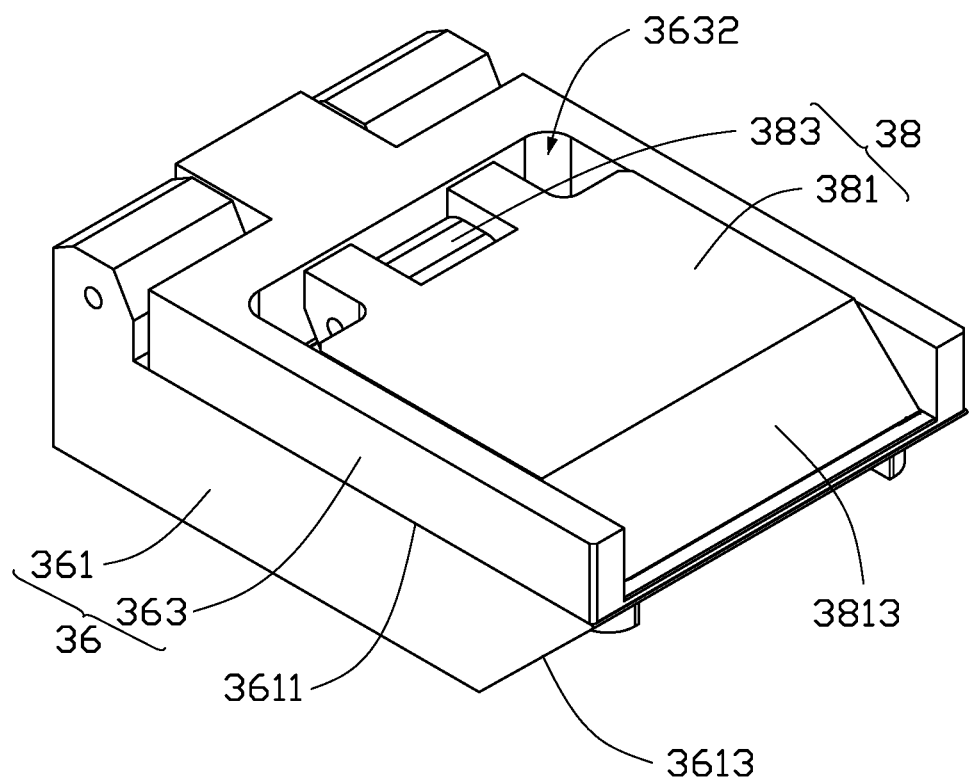
FIG. 4 is a perspective view illustrating the structure of the first holding part and the second holding part in FIG. 2 in yet another state.

Referring to FIGS. 2 to 4, a first holding parts 36 includes a first seat 361, a first plate 363, and a first elastic part (not shown in Figs). The first seat 361 is set on the fixing plate 321. The first plate 363 is pivoted to the first seat 361. The first elastic part contacts the first plate 363 to drive the first plate 363 to clamp on the first seat 361.

The second holding parts 38 are set on the rotating plate 34. In the embodiment, the number of the second holding parts 38 is four. The four second holding parts 38 are matched with the four first holding parts 36.

A second holding part 38 includes a second seat 381, a second plate 383, and a second elastic part (not shown in Figs). The second seat 381 is set on the rotating plate 34. The second plate 383 is pivoted to the second seat 381. The second elastic part contacts the second plate 383 to drive the second plate 383 to clamp on the second seat 381.

The first seat 361 includes a first clamping surface 3611 towards the first plate 363 and a first contacting surface 3613 towards the second holding part 38. The second seat 381 includes a second clamping surface 3811 towards the second plate 383 and a second contacting surface 3813 towards the first holding parts 36. Referring to FIG. 2, in an initial state, the first clamping surface 3611 is parallel with the second clamping surface 3811.

The first contacting surface 3613 can contact the second contacting surface 3813 and restricts the angle of rotation of the second contacting surface 3813 while the second holding part 38 is rotating. Referring to FIG. 3, the angle between the first contacting surface 3613 and the first clamping surface 3611 is 45 degrees and the angle between the second contacting surface 3813 and the second clamping surface 3811 is also 45 degrees. After the second holding part 38 rotates 90 degrees clockwise, the first contacting surface 3613 contacts the second contacting surface 3813 to limit further rotation of the second holding part 38. In another embodiment, the angle between the first contacting surface 3613 and the first clamping surface 3611 and the angle between the second contacting surface 3813 and the second clamping surface 3811 can be between 0 and 90 degrees.

Referring to FIG. 4, the first plate 363 defines a first avoiding hole 3632, revealing the first clamping surface 3611. When the second holding part 38 rotates counterclockwise, it can rotate 180 degrees and enter the first avoiding hole 3632 until it contacts the first clamping surface 3611. The first avoiding hole 3632 is also used for avoiding bulging of the workpiece. In another embodiment, the first avoiding hole 3632 can be omitted.

In the embodiment, the second plate 383 defines a second avoiding hole 3832. When the second holding part 38 enters the first avoiding hole 3632 and contacts the first clamping surface 3611, the second avoiding hole 3832 avoids bulging of the workpiece. In another embodiment, the second avoiding hole 3832 can be omitted.

In the embodiment, one end of the rotating plate 34 is connected with a gear 341, using for connecting to the driving mechanism by a conveyor belt. In another embodiment, the gear 341 can be omitted and the rotating plate 34 connects to the driving mechanism directly.

When in use, the first holding part 36 clamps a first part of a workpiece, the second holding part 38 clamps a second part of the workpiece. The driving mechanism drives the second holding part 38 to rotate to bend the workpiece through one or more precise angles.

The bending test device 100 uses the driving mechanism driving the second holding part 38 to rotate to bend the workpiece.

The embodiments shown and described above are only examples. Many such details are found in the relevant art. Therefore, such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A bending test device, comprising:
   a base;
   a driving mechanism located on the base; and
   a bending mechanism located on the base and comprising:
      a supporting member located on the base;
      a rotating plate rotatably secured to the supporting member;
      a first holding part located on the supporting member and configured to clamp a first part of a workpiece; and
      a second holding part located on the rotating plate and configured to clamp a second part of the workpiece;
      wherein the driving mechanism rotates the second holding part by rotating the rotating plate to bend the workpiece.

2. The bending test device of claim 1, wherein the first holding part comprises:
   a first seat located on the supporting member;
   a first plate pivotally secured to the first seat; and
   a first elastic part driving the first plate to press the first seat.

3. The bending test device of claim 2, wherein the second holding part comprises:
   a second seat located on the rotating plate;
   a second plate pivoted to the second seat; and
   a second elastic part driving the second plate to press the second seat.

4. The bending test device of claim 3, wherein the first seat comprises a first clamping surface facing the first plate and a first contacting surface facing the second holding part; the second seat comprises a second clamping surface facing the second plate and a second contacting surface facing the first holding part, wherein the first contacting surface abuts the second contacting surface to define a rotating range of the second seat.

5. The bending test device of claim 4, wherein the first plate defines a first avoiding hole, and the second holding part rotates to be engaged into the first avoiding hole to abut the first clamping surface.

6. The bending test device of claim 5, wherein the second plate defines a second avoiding hole, the second avoiding hole is configured to prevent bulging of the workpiece, and the second holding part abuts the first clamping surface.

7. The bending test device of claim 4, wherein a first angle defined between the first contacting surface and the first clamping surface is 45 degrees; a second angle defined between the second contacting surface and the second clamping surface is 45 degrees, and when the second holding part rotates 90 degrees, the first contacting surface contacts with the second contacting surface to restrict the second holding part from rotating.

8. The bending test device of claim 1, wherein the supporting member comprises a fixing plate; two side plates located on the opposite ends of the fixing plate; and two ends of the rotating plate are rotatably through the two side plates respectively.

9. The bending test device of claim 1, wherein the number of the first holding part is four; the number of the second holding parts is four and the four second holding parts are respectively matched with the four first holding parts.

10. The bending test device of claim 1, wherein one end of the rotating plate is connected with a gear, and a conveyor belt is driven by the driving mechanism with the gear.

11. A bending mechanism, comprising:
    a supporting member;
    a rotating plate rotatably secured to the supporting member;
    a first holding part located on the supporting member and configured to clamp a first part of a workpiece; and
    a second holding part located on the rotating plate and configured to clamp a second part of the workpiece;
    wherein the rotating plate rotates the second holding part to bend the workpiece.

12. The bending mechanism of claim 11, wherein the first holding part comprises:
    a first seat located on the supporting member;
    a first plate pivotally secured to the first seat; and
    a first elastic part driving the first plate to press the first seat.

13. The bending mechanism of claim 12, wherein the second holding part comprises:
    a second seat located on the rotating plate;
    a second plate pivoted to the second seat; and
    a second elastic part driving the second plate to press the second seat.

14. The bending mechanism of claim 13, wherein the first seat comprises a first clamping surface facing the first plate and a first contacting surface facing the second holding part; the second seat comprises a second clamping surface facing the second plate and a second contacting surface facing the first holding part, wherein the first contacting surface abuts the second contacting surface to define a rotating range of the second seat.

15. The bending mechanism of claim 14, wherein the first plate defines a first avoiding hole, and the second holding part rotates to be engaged into the first avoiding hole to abut the first clamping surface.

16. The bending mechanism of claim 15, wherein the second plate defines a second avoiding hole, the second avoiding hole is configured to prevent bulging of the workpiece, and the second holding part abuts the first clamping surface.

17. The bending mechanism of claim 14, wherein a first angle defined between the first contacting surface and the first clamping surface is 45 degrees; a second angle defined between the second contacting surface and the second clamping surface is 45 degrees, and when the second holding part rotates 90 degrees, the first contacting surface contacts with the second contacting surface to restrict rotating of the second holding part.

18. The bending mechanism of claim 11, wherein the supporting member comprises a fixing plate; two side plates located on the opposite ends of the fixing plate; and two ends of the rotating plate are rotatably through the two side plates, respectively.

19. The bending mechanism of claim 11, wherein the number of the first holding part is four; the number of the second holding parts is four and the four second holding parts are respectively matched with the four first holding parts.

* * * * *